United States Patent [19]

Gissinger et al.

[11] Patent Number: 4,690,630
[45] Date of Patent: Sep. 1, 1987

[54] DEVICE FOR STRIPPING FROM A MOLD A COMPOSITE ELECTRICAL INSULATOR

[75] Inventors: Patrick Gissinger, Mariol; Yves Poutignat, Puy Guillaume, both of France

[73] Assignee: Ceraver, Paris, France

[21] Appl. No.: 855,260

[22] Filed: Apr. 24, 1986

[30] Foreign Application Priority Data

Mar. 25, 1986 [FR] France ............................ 86 04279

[51] Int. Cl.⁴ ........................ B29C 33/44; B25J 15/10
[52] U.S. Cl. ................................ 425/236; 198/468.2; 294/119.3; 414/416; 425/438; 425/441; 425/444
[58] Field of Search ................. 425/236, 436 R, 438, 425/441, 444; 198/468.2, 803.7; 294/63.2, 119.3; 414/416, 417

[56] References Cited

U.S. PATENT DOCUMENTS

| | | | |
|---|---|---|---|
| 2,225,672 | 12/1940 | Webb | 425/438 |
| 2,285,297 | 6/1942 | McGinnis | 425/438 |
| 2,589,101 | 3/1952 | Legullon et al. | 294/63.2 |
| 3,265,291 | 9/1965 | Derror | 425/436 |
| 3,836,312 | 9/1974 | Derror | 425/436 R |
| 3,907,483 | 9/1975 | York | 425/436 R |
| 4,119,217 | 10/1978 | Jones | 294/63.2 |
| 4,235,582 | 11/1980 | Holmes | 425/438 |
| 4,270,789 | 6/1981 | Cline | 294/63.2 |
| 4,444,423 | 4/1984 | Montferme et al. | 414/416 |
| 4,500,247 | 2/1985 | McKnight et al. | 414/416 |

Primary Examiner—Willard E. Hoag
Attorney, Agent, or Firm—Sughrue, Mion, Zinn, Macpeak and Seas

[57] ABSTRACT

Device consists of several gripping modules for gripping sheds on an electrical insulator, said modules being distributed along a moving beam which moves vertically to extract the insulator from the mold. The beam is supported by a moving frame designed to clear the gripper and insulator from the mold. The beam has variable dimensions enabling the number of modules to be varied according to insulator size, especially for long insulators of up to 8 meters.

5 Claims, 5 Drawing Figures

DEVICE FOR STRIPPING FROM A MOLD A COMPOSITE ELECTRICAL INSULATOR

This invention concerns a device for stripping from a mold a composite electrical insulator. Such an insulator for example comprises a core made basically of glass fibers impregnated with a synthetic resin and encased in a finned structure, ie. sheds, of elastomer material, made for example of EPDM.

A known way of making insulators of this type, which may extend to several meters in length, is to mold the sheds directly onto the core with a press. The press comprises a lower half-mold, or drag, and an upper half-mold, or cope. When the one-piece sheds have been cast, the cope is raised and the problem is to remove from the drag the insulator core and its still-hot sheds, which together form a very flexible, easily torn unit.

Hereto, the removal operation was performed by two workers, each grasping one end of the core; this procedure involves the risk of bending the core and imposes unwanted stresses between the core and its sheds. The problem is obviously critical with respect to insulators as much as several meters long.

Accordingly, the invention provides a device for stripping from a mold a composite insulator comprising a core member and elastomer sheds, said sheds being cast in a press having a drag and a cope. The device comprises a frame movable in translation in relation to the said press on guideways parallel to the axis of the core; this frame comprises a load carrying beam supporting a cylinder and a beam parallel to the load beam which is movable vertically in translation by means of the cylinder; the moving beam is provided with a plurality of gripping modules acting on a few of the said sheds, each module having a bearing part for part of the face of a shed and a part having a recess for an inflatable packing member designed to be applied to the corresponding part of the other face of said shed.

The bearing part is advantageously a metal part with an outline matching the shape of the concerned shed. Alternatively however, this bearing part can be of the same type as the inflatable packing member with which it cooperates to grip the shed.

The inflatable packing is preferably made of silicone so as to be able to withstand the high temperatures obtaining in the mold which can be on the order of 180° C.

The side of the packing intended to contact the shed is advantageously provided with serrations.

The pressure inside the inflatable packing at the time of gripping the shed is of the order of three bar.

Other features and advantages of the invention will appear in the course of the following description of one embodiment given for purposes of illustration, but in no way limiting the scope of the invention, with reference to the appended drawings in which.

Figure 4:
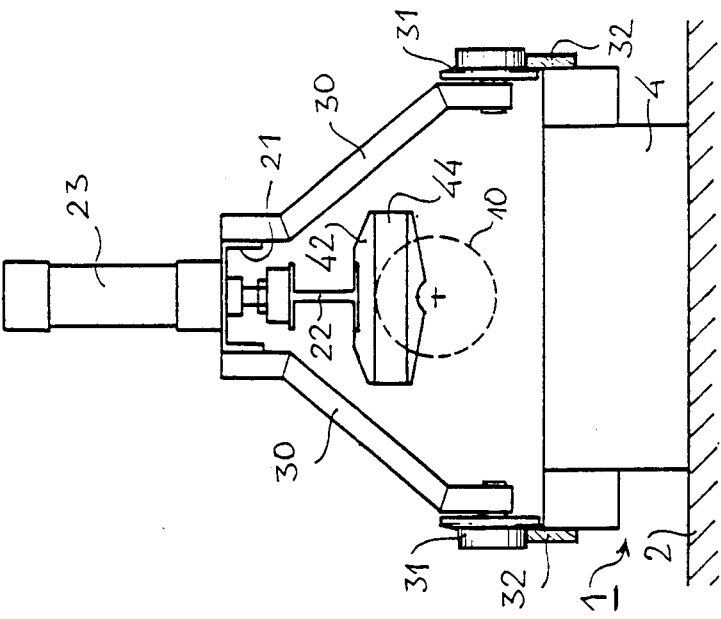
FIG. 4 is a side view of the installation depicted in FIG. 1 with the gripping device lowered.
Figure 5:
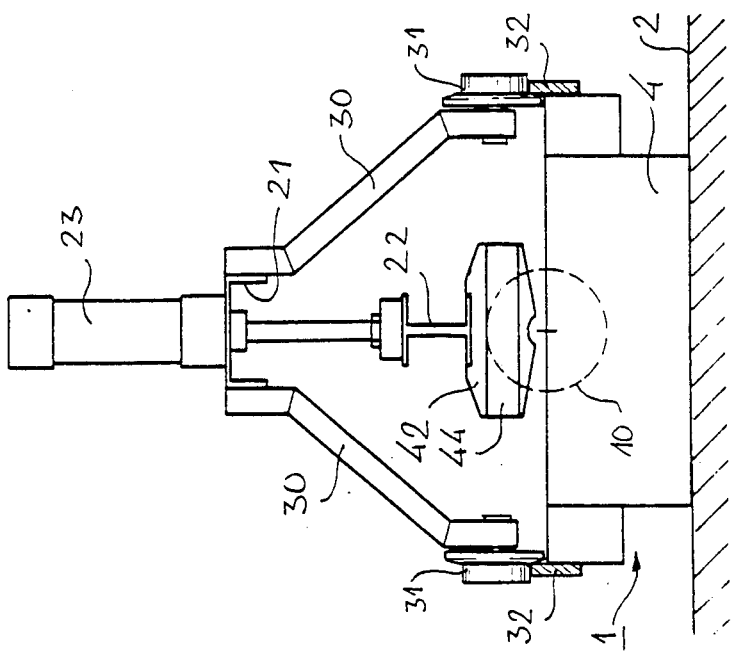

and FIG. 5 is a side view analogous to that of FIG. 4, except with the gripping device in raised position.

Figure 1:
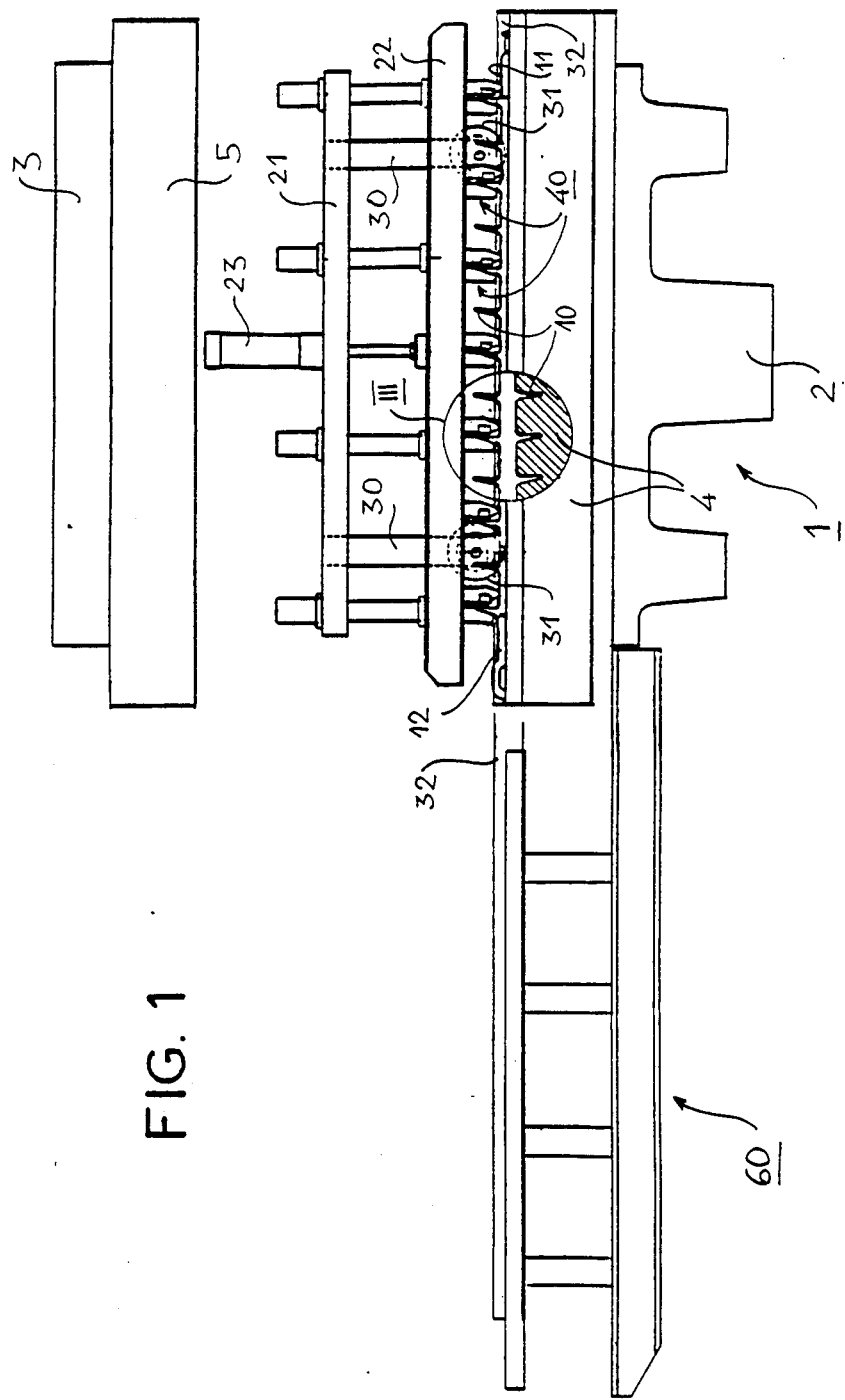
FIG. 1 is a view of the press or molding machine as a whole, with the cope thereof in raised position for taking out the casting, which is still in the drag part of the mold.

Referring first to FIG. 1, this shows a molding machine or press 1 basically comprising a slide 2 supporting a drag 4 and a slide 3 supporting a cope 5. In the position of the machine as illustrated, molding of the sheds 10 of the insulator 13 has been accomplished. The end pins 11 and 12 of the latter are apparent. The cope 5 has been raised and the stripping device according to the invention has been moved into operating position.

As can be seen from FIGS. 1 and 4, the inventive device comprises a carrying beam 21 supporting a moving beam 22, the latter said beam being operable to move vertically when actuated by an air cylinder 23.

Side beams 30 attached to the carrying beam 21 are equipped with wheels 31 which cooperate with horizontal guideways 32 attached to the machine frame.

Figure 2:
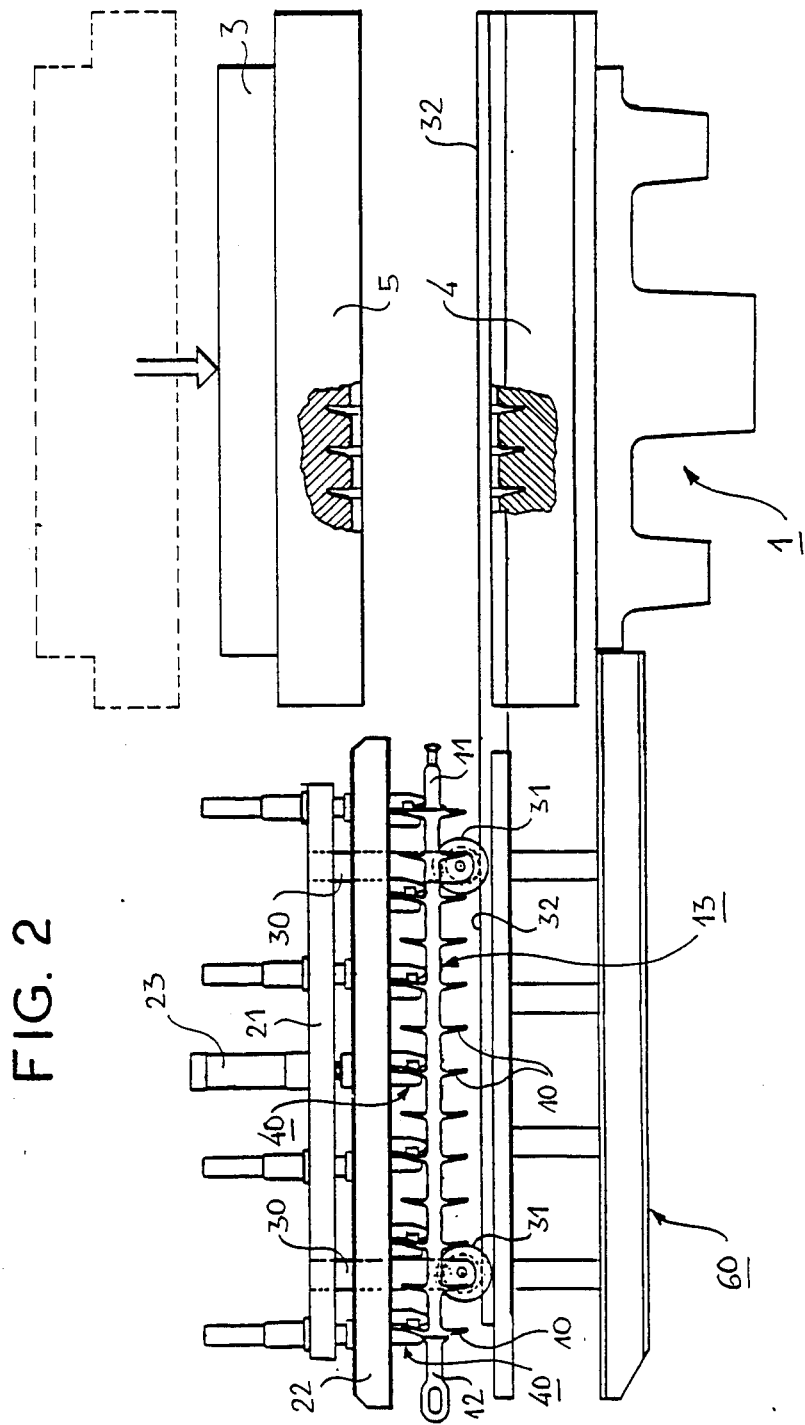
FIG. 2 shows the insulator of FIG. 1 being handled by a stripping device according to the invention.

As can be seen from FIG. 2, the horizontal guideways 32 extend beyond the molding machine proper to a part clearing frame 60 to which the insulator 13 is brought after being extracted from the press.

The actual shed gripping device comprises a set of gripping modules 40 moving with the moving beam 22.

Figure 3:
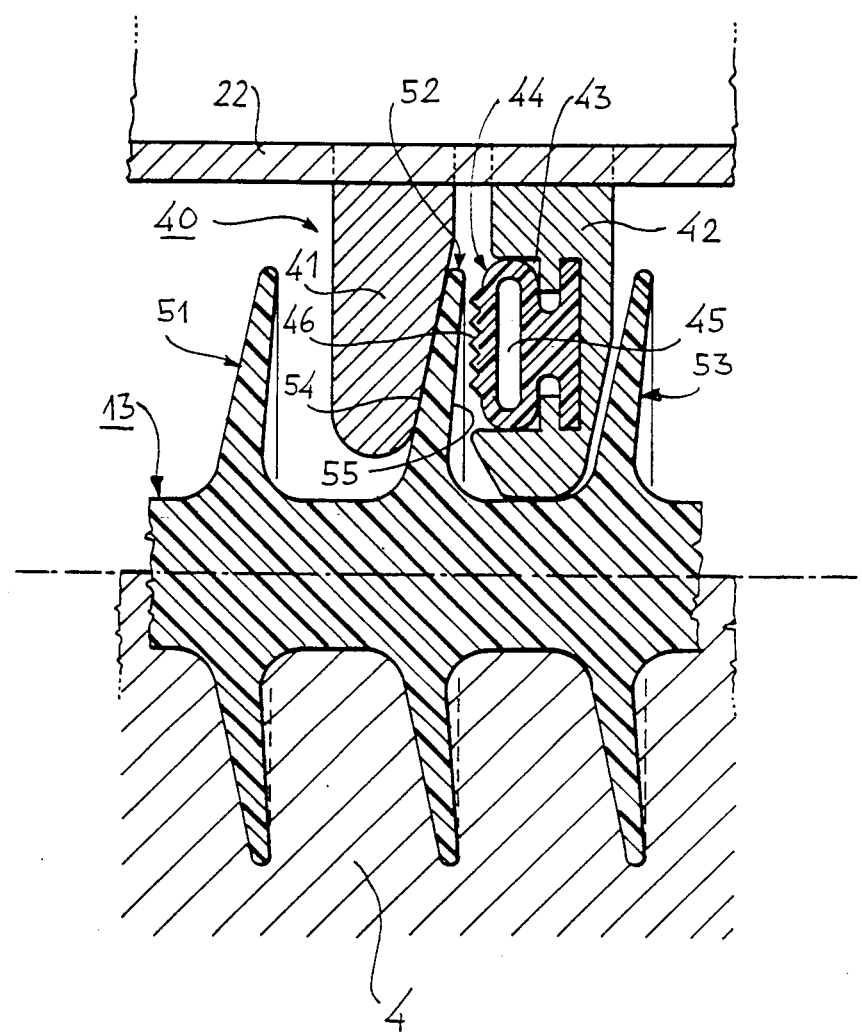
FIG. 3 is a blown-up, partial cross-section of an element of the demolding device according to the invention corresponding to the circled detail III of FIG. 1.

FIG. 3 shows in detail an essential part of the gripping module associated with sheds 51, 52, 53. The concerned module is intended to grip the shed 52. It comprises a first, stiff metal part 41 forming a bearing surface for one side 54 of the shed 52 and a second metal part 42 comprising a recess 43 for a silicon packing 44 able to withstand temperatures on the order of 180° C. The packing surface 46 facing the other side 55 of the shed is advantageously serrated and when said inflatable packing 44 is inflated it grips said shed 52. The internal cavity 45 of packing 44 is pressurized to a maximum of three bar.

The operation of the stripping device according to the invention will now be described.

During casting of the part, the stripping device is kept in the part clearing area 60. When the cope 5 is raised, the shed molding is at a temperature of about 180° C. and is thus particularly deformable given its very low module of elasticity.

The gripping device is driven to align with the drag 4 by translation along the guideways 32.

The moving beam 22 equipped with its gripping modules 40 is lowered by the action of the air cylinder 23. The several modules fit in between the sheds, then the packings are inflated (as per FIGS. 1 and 4) so that a force is applied to and uniformly distributed about the insulator 13. The gripping unit is thereafter raised up and the insulator 13 is thus extracted from the drag 4 (as represented in FIG. 5) without tearing the sheds.

The gripping device is then guided to the part clearing station 60 (FIG. 2) and a new molding cycle can begin.

The moving beam 22 descends again; the packing is deflated and the insulator 13 placed on a stand, after which the moving beam is raised up for the next cycle.

If the insulator is to be eight or so meters long, molding of the sheds can be carried out in the press in successive sections.

Obviously, the invention is not limited to the embodiment just described. The actual number of modules 40 on the beam and their pattern of distribution along said beam can be adapted to suit the particular length of an insulator. The shapes of the gripping module parts and their packings need not be as illustrated, but can be made to match the various shed shapes which may be provided on insulators.

It may further be envisaged to include an inflatable packing in each side of the gripping means to grasp both sides of a shed.

The device according to the invention helps in particular to boost productivity in the molding production line.

What is claimed is:

1. In a press molding apparatus having top and bottom mold members defining mold cavities suitable for molding a composite electrical insulator having a core member and a finned casing of elastomer sheds, the improvement comprising a stripping device having a frame movable in translation relative to said press on guideways parallel to the axis of the insulator core, said frame comprising a carrying beam supporting a cylinder actuator and a beam parallel to the carrying beam and movable in vertical translation by means of said cylinder, the movable beam being equipped with a plurality of gripping modules for acting upon a few of the said sheds, each module having a first bearing part for part of one side of a shed and a second part having a recess, and an inflatable packing within said second part for application against the corresponding part of the other side of the shed fin.

2. Stripping device according to claim 1, wherein said packing is made of silicone.

3. Apparatus according to claim 1 wherein the improvement includes means for inflating the packing to a pressure up to 3 bar.

4. Apparatus according to claim 1 or 3, wherein said first bearing part is a metal part shaped to conform to the shed which it contacts.

5. Apparatus according to claim 1 or 3, wherein the said first bearing part is a metal part with a recess containing an inflatable packing analogous to that of said second gripper bearing part.

* * * * *